United States Patent
Shinagawa et al.

(10) Patent No.: US 9,732,696 B2
(45) Date of Patent: Aug. 15, 2017

(54) CONTROL DEVICE FOR INTERNAL COMBUSTION ENGINE AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Tomohiro Shinagawa, Sunto-gun (JP); Hiroyuki Mizuno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 15/044,689

(22) Filed: Feb. 16, 2016

(65) Prior Publication Data
US 2016/0245214 A1  Aug. 25, 2016

(30) Foreign Application Priority Data
Feb. 19, 2015  (JP) ................. 2015-030689

(51) Int. Cl.
*F02D 41/40* (2006.01)
*F02D 41/12* (2006.01)
*F02D 41/04* (2006.01)

(52) U.S. Cl.
CPC ........... *F02D 41/40* (2013.01); *F02D 41/126* (2013.01); *F02D 41/047* (2013.01); *Y02T 10/44* (2013.01)

(58) Field of Classification Search
CPC .... F02D 41/402; F02D 41/407; F02D 41/123; F02D 41/126; Y02T 10/44

USPC .............. 123/294–299, 305, 198 D, 198 DB, 123/198 F; 701/102–105, 112, 114
See application file for complete search history.

(56) References Cited

U.S. PATENT DOCUMENTS

| | | | |
|---|---|---|---|
| 2014/0202138 A1* | 7/2014 | Tanaka | F02D 41/123 60/286 |
| 2015/0184605 A1* | 7/2015 | Matsumura | F02D 41/0295 60/285 |
| 2015/0330323 A1* | 11/2015 | Aoki | F02D 41/1456 60/285 |

FOREIGN PATENT DOCUMENTS

| | | |
|---|---|---|
| JP | 2008-138628 A | 6/2008 |
| JP | 2010-223008 A | 10/2010 |

\* cited by examiner

*Primary Examiner* — John Kwon
*Assistant Examiner* — Johnny H Hoang
(74) *Attorney, Agent, or Firm* — Oliff PLC

(57) ABSTRACT

In a control device for an internal combustion engine, when a fuel-supply cutoff process ends and fuel injection restarts, an increase ratio based on which a base injection amount is increased is set such that the increase ratio when a duration of the fuel-supply cutoff process is long is higher than the increase ratio when a duration of the fuel-supply cutoff process is short. In addition, the increase ratio is decreased with a lapse of time after fuel injection restarts. Further, a decrease rate that is an amount by which the increase ratio is decreased within a prescribed period of time is set such that the decrease rate in the case where the duration of the fuel-supply cutoff process is long is higher than the decrease rate in the case where the duration of the fuel-supply cutoff process is short.

6 Claims, 6 Drawing Sheets

CONTROL DEVICE FOR INTERNAL COMBUSTION ENGINE AND CONTROL METHOD FOR INTERNAL COMBUSTION ENGINE

INCORPORATION BY REFERENCE

The disclosure of Japanese Patent Application No. 2015-030689 filed on Feb. 19, 2015 including the specification, drawings and abstract is incorporated herein by reference in its entirety.

BACKGROUND

1. Technical Field

The invention relates to a control device for an internal combustion engine, the control device being configured to execute a fuel-supply cutoff process.

2. Description of Related Art

Japanese Patent Application Publication No. 2008-138628 (JP 2008-138628 A) describes a device that corrects the fuel injection amount such that the fuel injection amount is increased, when a fuel-supply cutoff process ends and fuel injection restarts. The device described in JP 2008-138628 A increases the amount of fuel injected after the end of the fuel-supply cutoff process, such that the increase ratio for the fuel injection amount (i.e., the ratio based on which the fuel injection amount is increased) in the case where the duration of the fuel-supply cutoff process is long is higher than that in the case where the duration of the fuel-supply cutoff process is short. Further, the device gradually decreases the increase ratio for the fuel injection amount at a prescribed rate with the lapse of time after the fuel-supply cutoff process ends and fuel injection restarts.

SUMMARY

When the increase ratio for the fuel injection amount is set to a high value due to the long duration of the fuel-supply cutoff process as described above, it takes a long time to gradually decrease the increase ratio for the fuel injection amount to zero at the prescribed rate. Consequently, the period during which the fuel injection amount is corrected to be increased may be unnecessarily long.

The invention provides a control device for an internal combustion engine and a control method for an internal combustion engine, the control device and control method preventing the period during which the fuel injection amount is corrected to be increased, from being unnecessarily long when a fuel-supply cutoff process ends and fuel injection restarts.

An example aspect of the disclosure provides a control device for an internal combustion engine, the control device including an electronic control unit configured to control a fuel injection valve that injects fuel to be supplied to a combustion chamber of the internal combustion engine. The electronic control unit is configured to calculate a base injection amount based on an amount of air taken into the internal combustion engine. The base injection amount is a base value of a fuel injection amount. The electronic control unit is configured to execute a fuel-supply cutoff process. The fuel-supply cutoff process is a process of stopping fuel injection from the fuel injection valve. The electronic control unit is configured to correct the base injection amount such that the base injection amount is increased, when ending the fuel-supply cutoff process and restarting fuel injection. The electronic control unit is configured to control the fuel injection valve based on the base injection amount corrected to be increased, when the fuel-supply cutoff process ends. The electronic control unit is configured to set an increase ratio based on which the base injection amount is increased, such that the increase ratio when a duration of the fuel-supply cutoff process is long is higher than the increase ratio when a duration of the fuel-supply cutoff process is short. The electronic control unit is configured to decrease the increase ratio with a lapse of time after fuel injection restarts. The electronic control unit is configured to set a decrease rate that is an amount by which the increase ratio is decreased within a prescribed period of time, such that the decrease rate in the case where the duration of the fuel-supply cutoff process is long is higher than the decrease rate in the case where the duration of the fuel-supply cutoff process is short.

The internal volume of the combustion chamber of the internal combustion engine does not become zero even when a piston reaches the top dead center. When the piston reaches the top dead center, the interval volume of the combustion chamber is the minimum internal volume that is larger than zero. Thus, while air-fuel mixture combustion control is executed, gas in an amount corresponding to the minimum internal volume of the combustion chamber remains in the combustion chamber after the burned air-fuel mixture is discharged from the combustion chamber to an exhaust passage. On the other hand, while the fuel-supply cutoff process is executed, the air-fuel mixture in an amount corresponding to the minimum internal volume, out of the air-fuel mixture burned before the fuel-supply cutoff process, is also gradually discharged from the combustion chamber. As a result, the gas in the combustion chamber is replaced with newly-taken air as the duration of the fuel-supply cutoff process is prolonged.

In the case where the fuel-supply cutoff process stops and fuel injection restarts, when the injection amount is set based on the amount of air taken into the combustion chamber such that a desired air-fuel ratio is achieved, the air-fuel ratio achieved based on the injection amount becomes leaner than the desired air-fuel ratio. The first reason for this is that the amount of air present in the combustion chamber is larger than the amount of air taken into the combustion chamber by an amount corresponding to the minimum volume. The second reason for this is that fuel adheres to the inner wall surface of an intake port and the inner wall surface of a cylinder, and a portion of the fuel is not burned. The amount of fuel which is not burned increases as the duration of the fuel-supply cutoff process is prolonged. The inventors discovered that the amount of fuel which is not burned is gradually decreased after the fuel-supply cutoff process stops and fuel injection restarts.

In a case where the increase ratio is decreased at a constant decrease rate, when the increase ratio at the restart of fuel injection is high, the period during which the fuel injection amount is corrected to be increased may exceed the period required to inhibit the air-fuel ratio from being excessively lean due to the above-described adhesion of the fuel.

In contrast to this, with the above-described configuration, the decrease rate by which the increase ratio is decreased, is set such that the decrease rate in the case where the duration of the fuel-supply cutoff process is long is higher than the decrease rate in the case where the duration of the fuel-supply cutoff process is short. Thus, even when the increase ratio at the restart of fuel injection is high, the period during which the base fuel injection amount is corrected to be increased, is prevented from being unnecessarily long. As a result, the period during which the fuel injection amount is corrected to be increased, is prevented from being excessively long when the fuel-supply cutoff process ends and fuel injection restarts.

In the control device according to the above aspect, the electronic control unit may be configured to calculate an increase coefficient based on the duration of the fuel-supply cutoff process, and the electronic control unit may be configured to multiply the base injection amount by the calculated increase coefficient to correct the base injection amount such that the base injection amount is increased, the electronic control unit may be configured to calculate a correction parameter based on the duration of the fuel-supply cutoff process, and the electronic control unit may be configured to periodically correct the increase coefficient based on the calculated correction parameter.

The base injection amount fluctuates depending on the amount of air taken into the combustion chamber. Thus, the amount by which the injection amount is corrected to be increased in order to bring the air-fuel ratio to a desired air-fuel ratio also fluctuates depending on the base injection amount. In this regard, with the above-described configuration, the increase coefficient by which the base injection amount is multiplied is used, and thus the amount by which the injection amount is corrected to be increased is set to an appropriate value through a simple process. Further, the increase coefficient is decreased by periodically correcting the increase coefficient. As a result, the increase ratio is appropriately decreased through the simple process.

In the control device according to the above aspect, the electronic control unit may be configured to increase the decrease rate by correcting the correction parameter based on a length of time that has elapsed after the fuel-supply cutoff process ends and fuel injection restarts.

When the decrease rate in a prescribed period immediately after a process of decreasing the increase ratio starts is appropriately set by periodically correcting the increase coefficient based on the correction parameter, an actual decrease rate per unit time may become lower than an appropriate decrease rate as time progresses after the decreasing process starts. In contrast to this, with the above-described configuration, such a situation is inhibited from occurring, by correcting the correction parameter based on the time that has elapsed after the restart.

In the control device according to the above aspect, the correction parameter may be an attenuation coefficient by which the increase coefficient is periodically multiplied. With the above-described configuration, the increase coefficient is periodically multiplied by the attenuation coefficient, and thus the increase coefficient decreases in an exponential manner. As a result, the increase ratio is decreased in an exponential manner.

In the control device according to the above aspect, the fuel injection valve may supply fuel to the combustion chamber by directly injecting the fuel into the combustion chamber. With the above-described configuration, in some cases, a portion of the fuel injected from the fuel injection valve fuel adheres to the inner wall surface of the cylinder, and a portion of the fuel adhering to the inner wall surface of the cylinder is not burned. The amount of fuel which adheres to the inner wall surface of the cylinder and is not burned decreases as time progresses after the fuel-supply cutoff process ends and fuel injection restarts. The amount of decrease in the fuel that adheres to the inner wall surface of the cylinder and is not burned is compensated for by setting the increase ratio for which the decrease rate is set as described above.

Another example aspect of the disclosure provides a control method for an internal combustion engine. The control method includes: controlling a fuel injection valve that injects fuel to be supplied to a combustion chamber of the internal combustion engine; calculating a base injection amount based on an amount of air taken into the internal combustion engine, the base injection amount being a base value of a fuel injection amount; executing a fuel-supply cutoff process, the fuel-supply cutoff process is a process of stopping fuel injection from the fuel injection valve; correcting the base injection amount such that the base injection amount is increased, when the fuel-supply cutoff process ends and fuel injection restarts; controlling the fuel injection valve based on the base injection amount corrected to be increased, when the fuel-supply cutoff process ends; setting an increase ratio based on which the base injection amount is increased, such that the increase ratio when a duration of the fuel-supply cutoff process is long is higher than the increase ratio when a duration of the fuel-supply cutoff process is short; decreasing the increase ratio with a lapse of time after fuel injection restarts; and setting a decrease rate that is an amount by which the increase ratio is decreased within a prescribed period of time, such that the decrease rate in the case where the duration of the fuel-supply cutoff process is long is higher than the decrease rate in the case where the duration of the fuel-supply cutoff process is short.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, a control device for an internal combustion engine according to a first embodiment will be described with reference to the accompanying drawings.

Figure 1:
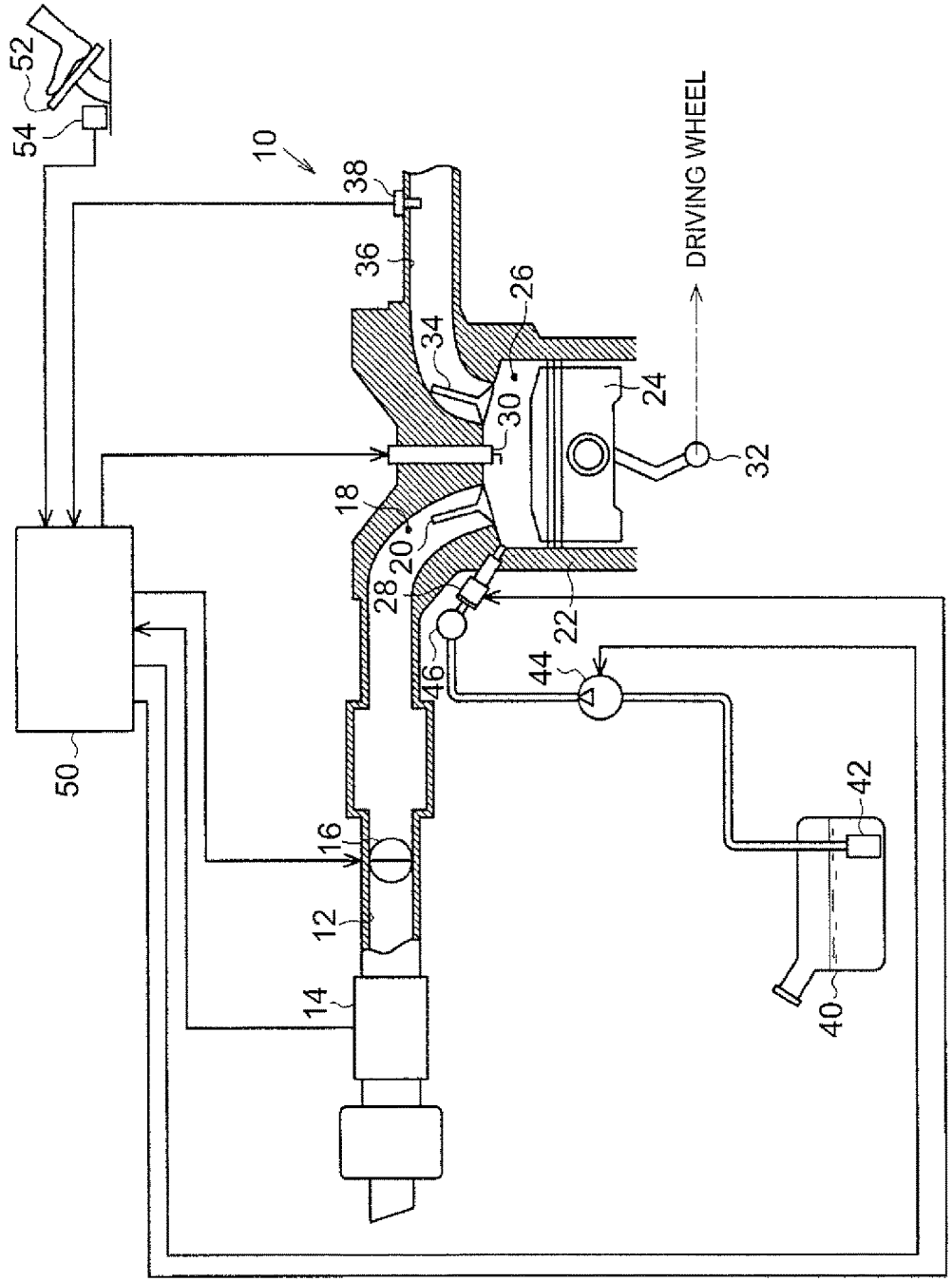
FIG. 1 is a configuration diagram of a system including a control device for an internal combustion engine according to a first embodiment.

An internal combustion engine 10 illustrated in FIG. 1 is a four-stroke engine. In an intake passage 12 of the internal combustion engine 10, an air flow meter 14 and a throttle valve 16 are arranged in this order from the upstream side. The air flow meter 14 detects an intake air amount, and the throttle valve 16 adjusts the intake air amount. The intake passage 12 is split, at a position downstream of the throttle valve 16, into branches for respective cylinders of the internal combustion engine 10, and then connected to combustion chambers 26 of the cylinders via intake ports 18.

Each combustion chamber 26 is defined by a cylinder 22 and a piston 24. The intake port 18 and the combustion chamber 26 are communicated with each other when an intake valve 20 is open. A crankshaft 32 is mechanically coupled to the pistons 24, and the crankshaft 32 can be coupled to drive wheels.

A fuel injection valve 28 and an ignition plug 30 are provided in the combustion chamber 26 of each cylinder. The fuel injection valve 28 injects fuel into the combustion chamber 26. An air-fuel ratio sensor 38 is provided in an exhaust passage 36 that is connected to the combustion chambers 26 of the cylinders. The air-fuel ratio sensor 38 detects an air-fuel ratio of the air-fuel mixture. The combustion chamber 26 and the exhaust passage 36 are communicated with each other when an exhaust valve 34 is open.

The internal combustion engine 10 is provided with a fuel tank 40 that stores the fuel to be injected from the fuel injection valves 28. A feed pump 42 is provided in the fuel tank 40. The feed pump 42 pumps out the fuel from the inside of the fuel tank 40.

A high-pressure fuel pump 44 further pressurizes the fuel pumped out from the fuel tank 40 by the feed pump 42, and then discharges the pressurized fuel to a high-pressure fuel pipe 46. The fuel injection valves 28 of the cylinders are connected to the high-pressure fuel pipe 46.

An electronic control unit (ECU) 50 is a control device configured to control the internal combustion engine 10. Detection signals from various sensors, such as the air flow meter 14, the air-fuel ratio sensor 38, and an accelerator sensor 54, are input into the ECU 50. The accelerator sensor 54 detects an operation amount of an accelerator pedal 52. The ECU 50 controls the controlled variables of the internal combustion engine 10 by controlling actuators, such as the fuel injection valves 28, provided at various portions of the internal combustion engine 10, based on detection results obtained by the sensors. For example, the ECU 50 executes control to adjust the air-fuel ratio in the combustion chambers 26 to a target air-fuel ratio by controlling the fuel injection valves 28.

Figure 2:
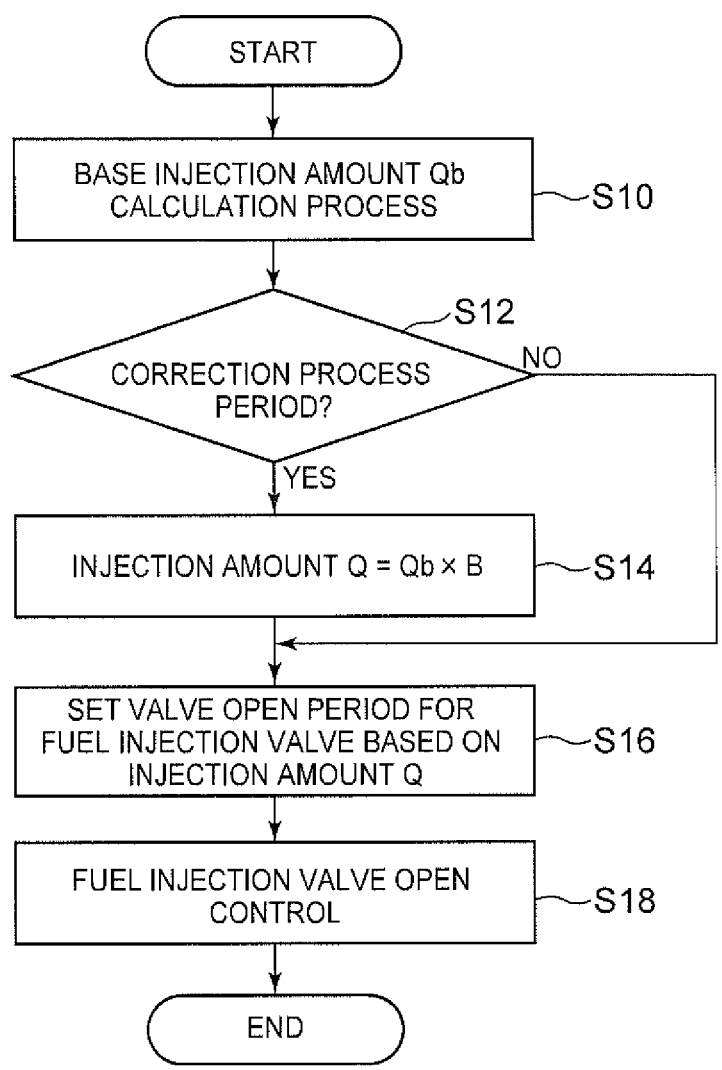
FIG. 2 is a flowchart illustrating the procedure of a process of controlling a fuel injection valve according to the first embodiment.

FIG. 2 illustrates the procedure of a process of controlling each fuel injection valve 28 according to the present embodiment. The process is repeatedly executed by the ECU 50 at prescribed intervals. It is desirable that the prescribed intervals be intervals of a prescribed crank angle.

In this series of processes, first, the ECU 50 calculates a base injection amount Qb based on the intake air amount detected by the air flow meter 14 (S10). Note that, another parameter may be taken into account in the calculation of the base injection amount Qb. For example, during a period in which feedback control is executed such that the air-fuel ratio detected by the air-fuel ratio sensor 38 approaches the target air-fuel ratio, the detected air-fuel ratio may be taken into account in the calculation of the base injection amount Qb. For example, the base injection amount Qb may be set to a value obtained by correcting the injection amount corresponding to the intake air amount detected by the air flow meter 14, using a manipulated variable of the feedback control. Note that, another parameter described above may be, for example, a coolant temperature.

Subsequently, the ECU 50 determines whether the present time is within a correction process period at the time of recovery from the fuel-supply cutoff process (S12). In this case, the correction process period is a period of time during which a correction process is executed after the fuel-supply cutoff process ends. In the fuel-supply cutoff process, fuel injection from the fuel injection valves 28 is stopped. The correction process is a process of correcting the base injection amount Qb using a coefficient B of increase (hereinafter, referred to as "increase coefficient B"). The increase coefficient B is an open-loop manipulated variable used in the control for preventing the air-fuel mixture to be burned in the combustion chambers 26 from being excessively lean when the fuel-supply cutoff process ends and fuel injection restarts.

When the ECU 50 determines that the present time is within the correction process period (S12: YES), the ECU 50 calculates an injection amount Q by multiplying the base injection amount Qb by the increase coefficient B calculated in a later-described process related to the correction process (S14). Subsequently, the ECU 50 sets, based on the injection amount Q, a valve open period that is required for each fuel injection valve 28 to inject the fuel in the injection amount Q (S16). Then, the ECU 50 controls each fuel injection valve 28 based on the valve open period set in Step S16 (S18).

Figure 3:
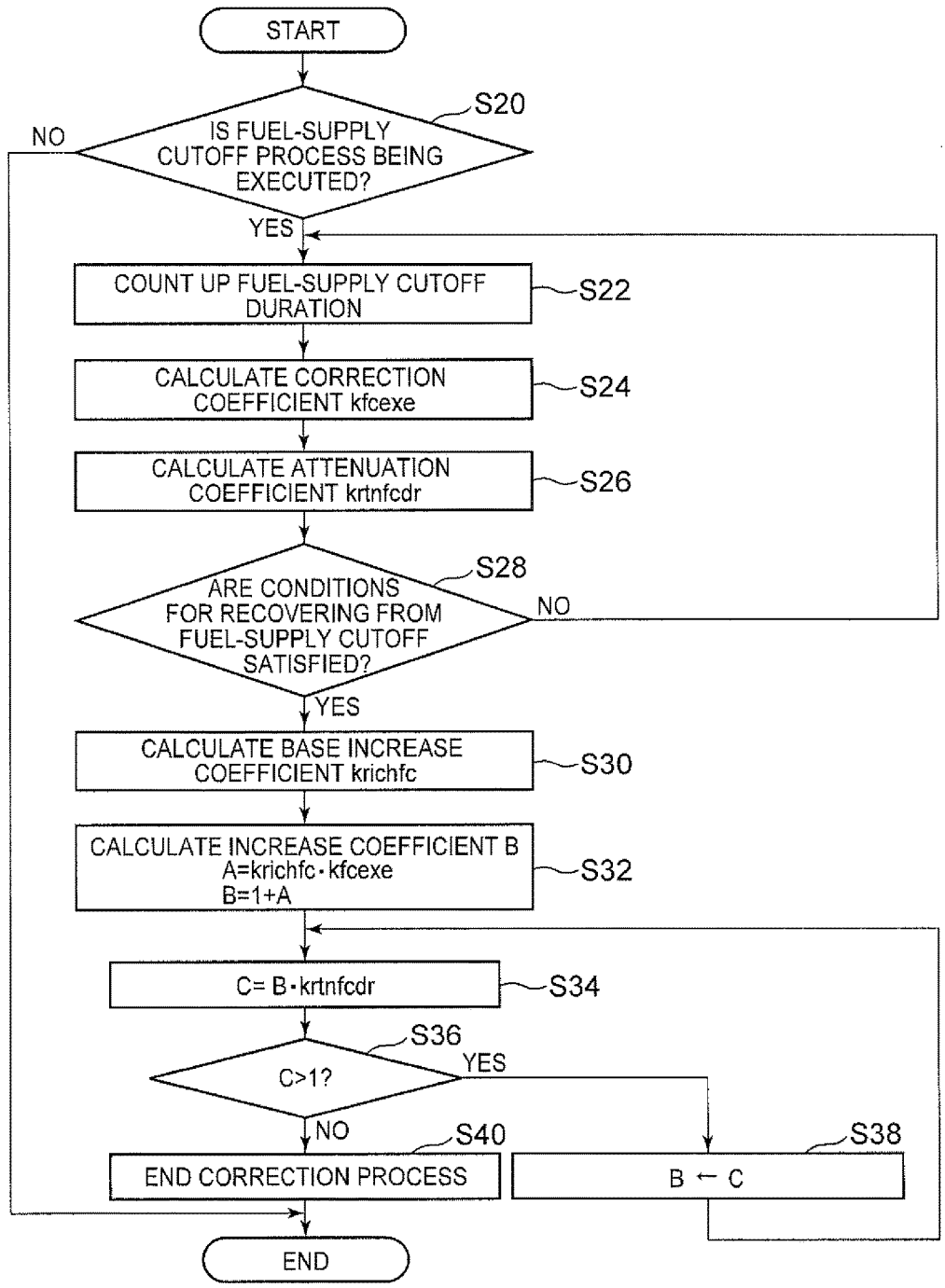
FIG. 3 is a flowchart illustrating the procedure of a process of calculating a coefficient of increase according to the first embodiment.

When the process of Step S18 is completed, the ECU 50 ends this series of processes. FIG. 3 illustrates the procedure of a process of calculating the increase coefficient B. The process is repeatedly executed by the ECU 50, for example, when prescribed conditions are satisfied.

In this series of processes, first, the ECU 50 determines whether the fuel-supply cutoff process is being executed (S20). The fuel-supply cutoff process is executed on the conditions that the rotational speed of the crankshaft 32 is equal to or higher than a prescribed speed that is higher than a target idle speed and the accelerator pedal 52 is released. In the fuel-supply cutoff process, fuel injection from the fuel injection valves 28 is stopped.

When the ECU 50 determines that the fuel-supply cutoff process is being executed (S20: YES), the ECU 50 counts up a fuel-supply cutoff duration that is a period of time during which the fuel-supply cutoff process continues (S22). Subsequently, the ECU 50 calculates a correction coefficient kfcexe based on the fuel-supply cutoff duration (S24). The correction coefficient kfcexe is a parameter for defining the increase coefficient B.

The ECU 50 sets the correction coefficient kfcexe in such a manner that the correction coefficient kfcexe used in the case where the fuel-supply cutoff duration is long is set to a value larger than the correction coefficient kfcexe used in the case where the fuel-supply cutoff duration is short. Specifically, in the present embodiment, the correction coefficient kfcexe is selectively set to one of three or more values that are different from each other. In order to set the correction coefficient kfcexe in this way, a map or relational expression that defines the relationship between the fuel-supply cutoff duration and the correction coefficient kfcexe may be stored in advance in a memory of the ECU 50.

Subsequently, the ECU 50 calculates an attenuation coefficient krtnfcdr based on the fuel-supply cutoff duration (S26). The attenuation coefficient krtnfcdr is a correction parameter based on which the increase coefficient B is corrected to be decreased with the lapse of time after the fuel-supply cutoff process ends (i.e., as time progresses from when the fuel-supply cutoff process ends). The ECU 50 sets the attenuation coefficient krtnfcdr in such a manner that the attenuation coefficient krtnfcdr used in the case where the fuel-supply cutoff duration is long is set to a value smaller than the attenuation coefficient krtnfcdr used in the case where the fuel-supply cutoff duration is short. In this way, the rate of decrease in the increase ratio for the base injection amount Qb (i.e., the ratio based on which the base injection amount Qb is increased) in the case where the fuel-supply cutoff duration is long is higher than that in the case where the fuel-supply cutoff duration is short. Specifically, in the present embodiment, the attenuation coefficient krtnfcdr is selectively set to one of three or more values that are different from each other. In order to set the attenuation coefficient krtnfcdr in this way, a map or relational expression that defines the relationship between the fuel-supply cutoff duration and the attenuation coefficient krtnfcdr may be stored in advance in the memory of the ECU 50.

Subsequently, the ECU 50 determines whether the condition for ending the fuel-supply cutoff process (recovery condition) is satisfied (S28). The recovery condition may be, for example, a condition that the rotational speed of the crankshaft 32 is equal to or lower than a specified speed that is a value between the prescribed speed and the target idle speed, or a condition that the accelerator pedal 52 is depressed. When the ECU 50 determines that the recovery condition is satisfied (S28: YES), the ECU 50 calculates a base increase coefficient krichfc (S30). The base increase coefficient krichfc is a base value for defining the increase ratio for the base injection amount Qb that is used when the fuel-supply cutoff process ends and fuel injection restarts. The base increase coefficient krichfc is a default value.

Subsequently, the ECU 50 calculates the increase coefficient B (S32). Specifically, the ECU 50 sets the increase coefficient B by adding "1" to a multiplication value A obtained by multiplying the base increase coefficient krichfc by the correction coefficient kfcexe. Because the increase coefficient B calculated by the ECU 50 in Step S30 has a positive correlation with the correction coefficient kfcexe, the increase coefficient B used in the case where the fuel-supply cutoff duration is long is calculated to be a larger value than the increase coefficient B used in the case where the fuel-supply cutoff duration is short.

The correction process is started when the calculation of the increase coefficient B is started. Thus, as illustrated in FIG. 2, the base injection amount Qb is corrected. Subsequently, the ECU 50 multiplies the increase coefficient B by the attenuation coefficient krtnfcdr, thereby calculating a determination parameter C for determining whether to end the correction process (S34). Then, the ECU 50 determines whether the determination parameter C is larger than "1" (S36). This is a process for determining whether to end the correction process. In other words, when the determination parameter C is equal to or less than "1", even if a value obtained by multiplying the present increase coefficient B by the attenuation coefficient krtnfcdr is set as a new increase coefficient B, the base injection amount Qb is not corrected to be increased.

When the ECU 50 determines that the determination parameter C is larger than "1" (S36: YES), the ECU 50 updates the increase coefficient B, thereby setting the value of the increase coefficient B to the value of the determination parameter C (S38). Then, the ECU 50 proceeds to the process of Step S34. In the present embodiment, the process of Step S36 is executed at crank angle intervals of 360 degrees. Thus, while the ECU 50 repeatedly makes a positive determination in Step S36, the increase coefficient B is updated at crank angle intervals of 360 degrees.

On the other hand, when the ECU 50 determines that the determination parameter C is equal to or less than "1" (S36: NO), the ECU 50 ends the correction process (S40). When the process of Step S40 is completed or when a negative determination is made in Step S20, the ECU 50 ends the series of processes illustrated in FIG. 3.

Figure 4:
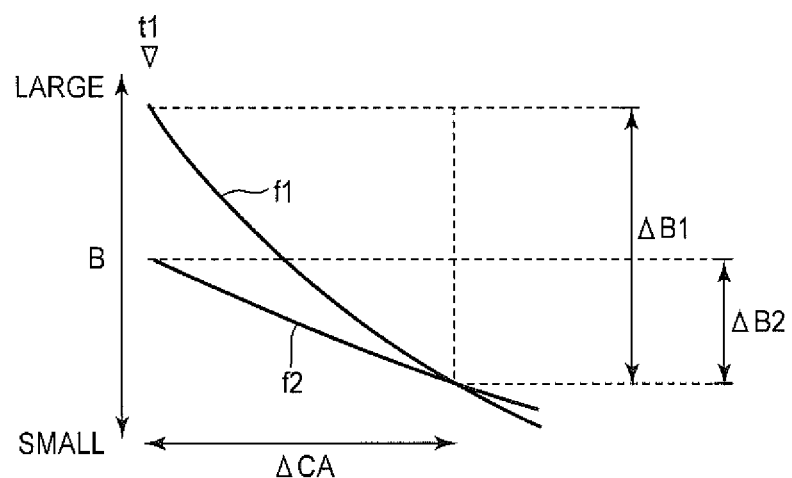
FIG. 4 is a time-series chart illustrating examples of transition of the coefficient of increase according to the first embodiment.

The operations of the present embodiment will be described below. In FIG. 4, time t1 is the point of time at which each increase coefficient B is calculated for the first time through the correction process. Each of curves f1, f2 indicates transition of the increase coefficient B. The curve f1 indicates transition of the increase coefficient B that is used in the case where the fuel-supply cutoff duration is long, and the curve f2 indicates transition of the increase coefficient B that is used in the case where the fuel-supply cutoff duration is short. The fuel-supply cutoff duration corresponding to the curve f1 is longer than the fuel-supply cutoff duration corresponding to the curve f2.

When the fuel-supply cutoff process ends and fuel injection restarts, the ECU 50 controls the fuel injection valves 28 such that each fuel injection valve 28 injects the fuel in an amount obtained by correcting the base injection amount Qb based on the increase coefficient B. As indicated at time t1 in FIG. 4, the increase coefficient B immediately after restart of fuel injection is set such that the increase coefficient B used in the case where the fuel-supply cutoff duration is long is larger than the increase coefficient B used in the case where the fuel-supply cutoff duration is short. Then, the increase coefficient B gradually decreases. In this case, a decrease amount $\Delta B2$ is smaller than a decrease amount $\Delta B1$. The decrease amount $\Delta B1$ is an amount by which the increase coefficient B decreases along the curve f1 within a prescribed period of time that is defined by a crank angle region $\Delta CA$. The decrease amount $\Delta B2$ is an amount by which the increase coefficient B decreases along the curve f2 within the prescribed period of time. In other words, the rate of decrease in the increase coefficient B within the prescribed period of time is higher in the case where the fuel-supply cutoff duration is long than in the case where the fuel-supply cutoff duration is short.

Immediately after the fuel-supply cutoff process ends and fuel injection restarts, the actual amount of newly-taken air in the combustion chamber 26 is larger than the intake air amount detected by the air flow meter 14.

That is, the minimum volume of the combustion chamber 26, which is the volume of the combustion chamber 26 when the piston 24 is positioned at the top dead center, is not zero. When fuel injection is performed, a portion of the air-fuel mixture burned in the combustion chamber 26, the portion corresponding to the minimum volume, is not discharged to the exhaust passage 36 through one exhaust stroke, and remains in the combustion chamber 26. Therefore, with the exception of the internal exhaust gas recirculation (EGR), in a state where the combustion chamber 26 is supplied with newly-taken air introduced through an intake stroke, the gas corresponding to the minimum volume is not newly-taken air but the air-fuel mixture that has been burned. However, the intake air amount detected by the air flow meter 14 corresponds to an amount obtained by subtracting the minimum volume from the maximum volume of the combustion chamber 26. Thus, when fuel injection is continuously performed, calculating the fuel injection amount using the intake air amount, which is detected by the air flow meter 14, as the newly-taken air amount is appropriate in controlling the air-fuel ratio such that the air-fuel ratio is adjusted to a target value.

However, while the fuel-supply cutoff process is being executed, the gas corresponding to the minimum volume is gradually replaced with newly-taken air. Thus, immediately after the fuel-supply cutoff process ends and fuel injection restarts, the intake air amount detected by the air flow meter 14 is smaller than the actual amount of newly-taken air in the combustion chamber 26.

In this regard, by increasing the fuel injection amount immediately after restart of fuel injection as described above, the fuel in an amount corresponding to the amount of newly-taken air in the combustion chamber 26 is injected, so that the air-fuel ratio in the combustion chamber 26 is prevented from being excessively lean.

Further, while the fuel-supply cutoff process is being executed, the amount of fuel adhering to, for example, the inner wall surface of the cylinder 22 gradually decreases. Thus, when the fuel-supply cutoff process ends and fuel injection restarts, a portion of the fuel injected from the fuel injection valve 28 adheres to, for example, the inner wall surface of the cylinder 22, and the portion of the fuel adhering thereto is not burned during a combustion stroke. The amount of fuel that is not burned, out of the fuel injected from the fuel injection valve 28, decreases with the lapse of time after the fuel-supply cutoff process ends and fuel injection restarts (i.e., as time progresses from when the fuel-supply cutoff process ends and fuel injection restarts). However, the total amount of fuel that is not burned, out of the fuel injected from the fuel injection valves 28 after the fuel-supply cutoff process ends and fuel injection restarts, is larger in the case where the fuel-supply cutoff duration is long than in the case where the fuel-supply cutoff duration is short.

In this regard, by setting the increase coefficient B to a larger value in the case where the fuel-supply cutoff duration is long than in the case where the fuel-supply cutoff duration is short, an appropriate amount of fuel is injected when the fuel-supply cutoff process ends and fuel injection restarts.

Moreover, the increase coefficient B gradually decreases based on the attenuation coefficient krtnfcdr with the lapse of time after the fuel-supply cutoff process ends and fuel injection restarts. Thus, a decrease in the amount of fuel that is not burned is reflected in the manner of increasing the fuel injection amount.

The rate of decrease in the increase coefficient B is higher in the case where the fuel-supply cutoff duration is long than in the case where the fuel-supply cutoff duration is short. Thus, although the increase coefficient B at the restart of fuel injection is larger in the case where the fuel-supply cutoff duration is long than in the case where the fuel-supply cutoff duration is short, it is possible to shorten the duration of time during which the increase coefficient B used in the case where the fuel-supply cutoff duration is long is larger than that used in the case where the fuel-supply cutoff duration is short.

The present embodiment described so far produces the following advantageous effects. The rate of decrease in the increase coefficient B used in the case where the fuel-supply cutoff duration is long is set higher than the rate of decrease in the increase coefficient B used in the case where the fuel-supply cutoff duration is short. Thus, the period during which the fuel injection amount is corrected to be increased is prevented from being excessively long when the fuel-supply cutoff process ends and fuel injection restarts.

The increase coefficient B is periodically corrected based on the attenuation coefficient krtnfcdr. Thus, regardless of the intake air amount detected by the air flow meter 14, the increase ratio for the base injection amount Qb (i.e., the ratio based on which the base injection amount Qb is increased) is decreased more appropriately and readily than in the case where the amount of decrease in the increase amount is directly set.

The increase coefficient B is updated based on the attenuation coefficient krtnfcdr at crank angle intervals of 360 degrees. Thus, the rate of decrease in the increase ratio for each cylinder is uniquely defined by the square of the attenuation coefficient krtnfcdr.

Hereinafter, a control device for an internal combustion engine according to a second embodiment will be described with reference to the accompanying drawings. The difference from the first embodiment will be mainly described below.

Figure 5:
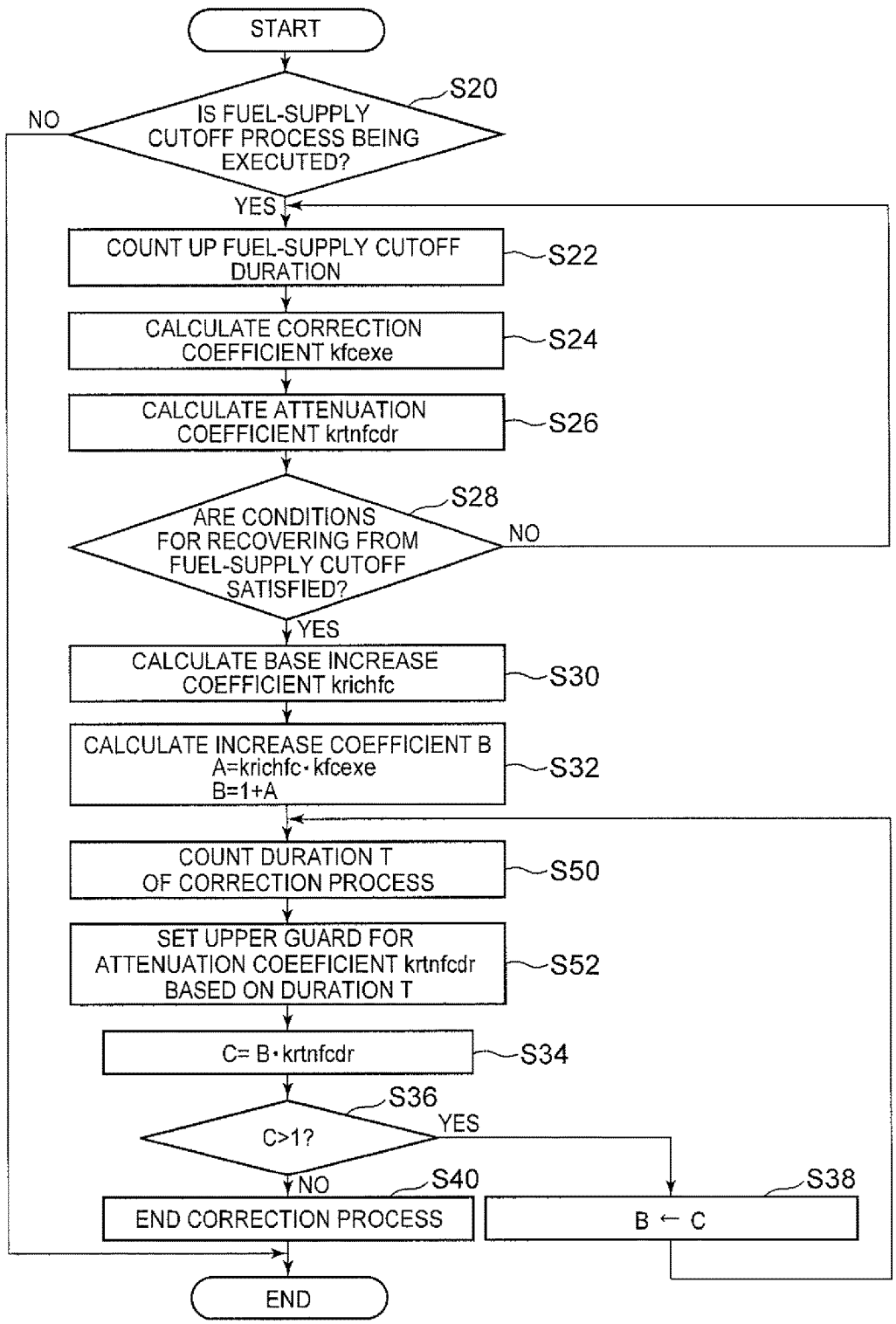
FIG. 5 is a flowchart illustrating the procedure of a process of calculating a coefficient of increase according to a second embodiment.

FIG. 5 illustrates the procedure of a process of calculating an increase coefficient B according to the present embodiment. The process is repeatedly executed by the ECU 50, for example, when prescribed conditions are satisfied. For the sake of convenience, in FIG. 5, the processes corresponding to those illustrated in FIG. 3 are denoted by the same step numbers as those in FIG. 3.

In this series of processes, when the process in Step S32 is completed, the ECU 50 counts up a duration T of the correction process (S50). Then, the ECU 50 sets an upper guard for the attenuation coefficient krtnfcdr based on the duration T (S52). In this case, the guard value is set to a smaller value as the duration T becomes longer. Thus, as the duration T becomes longer, the attenuation coefficient krtnfcdr is set to a smaller value through an upper guard process.

Figure 6:
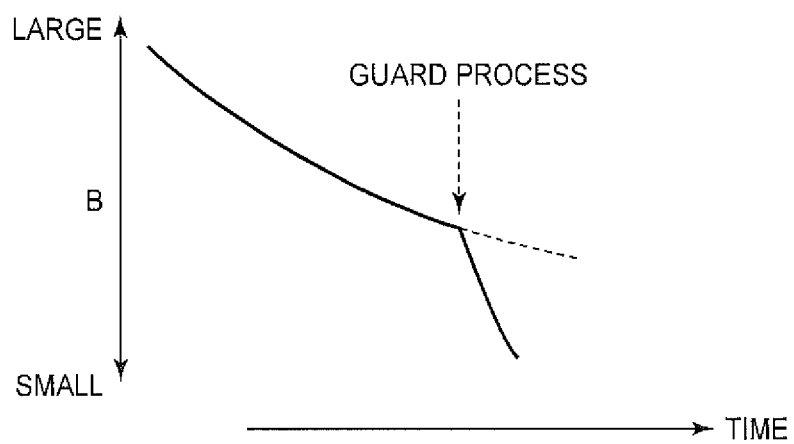
FIG. 6 is a time-series chart illustrating an example of transition of the coefficient of increase according to the second embodiment.

Next, the operations of the present embodiment will be described with reference to FIG. 6. As illustrated in FIG. 6, the increase coefficient B gradually decreases as the duration T becomes longer, and the rate at which the increase coefficient B gradually decreases is increased after the upper guard process is executed. If the attenuation coefficient krtnfcdr used to set the increase coefficient B in the initial stage of the correction process to the optimal value is continuously used as it is in the latter stage of the correction process, the amount of increase in the latter stage is excessively large in some case. However, according to the present embodiment, the attenuation coefficient krtnfcdr is corrected, and it is therefore possible to shorten the period during which the base injection amount is corrected to be unnecessarily increased.

At least one of the features of the above-described embodiments may be modified as follows.

The attenuation coefficient krtnfcdr, which is an example of the correction parameter, need not be selectively set to one of three or more values that are different from each other. The attenuation coefficient krtnfcdr may be set to either one of two values that are different from each other.

The correction parameter should not be limited to the attenuation coefficient krtnfcdr. For example, the correction parameter may be a rate value obtained by quantifying the attenuation rate itself. In this case, a process of subtracting the rate value from the increase coefficient B may be repeatedly executed at prescribed intervals.

Instead of setting the attenuation coefficient krtnfcdr or the rate value as a correction parameter, a decrease value may be set, as a correction parameter, based on, for example, the fuel-supply cutoff duration and the intake air amount.

The initial value of the increase coefficient B (or the correction coefficient kfcexe) need not be selectively set to one of three or more values that are different from each other, and may be set to either one of two values that are different from each other.

The increase coefficient based on a decrease in the air-fuel mixture that is burned in the combustion chamber 26 during the fuel-supply cutoff period and the increase coefficient based on a decrease in the amount of fuel adhering to, for example, the inner wall surface of the cylinder 22 need not be set integrally with each other as a single increase coefficient, and may be set separately from each other.

The intake air temperature may be taken into account in setting of the increase coefficient B. Instead of setting the increase coefficient, an increase value may be set based on, for example, the fuel-supply cutoff duration and the intake air amount.

When the increase coefficient based on a decrease in the air-fuel mixture that is burned in the combustion chamber 26 during the fuel-supply cutoff period and the increase coefficient based on a decrease in the amount of fuel adhering to, for example, the inner wall surface of the cylinder 22 are set individually, these increase coefficients may be respectively multiplied by corresponding attenuation coefficients that are different from each other. In this case, the attenuation coefficient for the increase coefficient based on a decrease in the amount of fuel adhering to, for example, the inner wall surface of the cylinder 22 may be set to a smaller value as the duration of the fuel-supply cutoff process is longer. In this case as well, the rate of decrease in the increase ratio becomes higher as the duration is longer. On the other hand, the increase coefficient based on a decrease in the air-fuel mixture that is burned in the combustion chamber 26 during the fuel-supply cutoff period may be decreased stepwise to zero after a prescribed period has passed, without setting an attenuation coefficient.

The parameter for defining the increase ratio should not be limited to the duration of the fuel-supply cutoff process. For example, a rotational speed may be taken into account in defining the increase ratio. In this case, even when the duration of the fuel-supply cutoff process is the same, the increase coefficient B in the case where the rotational speed is high is set to a value larger than the increase coefficient B in the case where the rotational speed is low.

As the parameter for defining the rate of decrease, the attenuation coefficient krtnfcdr is variably set based on only the duration of the fuel-supply cutoff process. However, the manner of setting the parameter for defining the rate of decrease should not be limited to this. For example, the intake air temperature may be taken into account in setting of the parameter for defining the rate of decrease. In this case, the rate of decrease is set higher by setting the attenuation coefficient krtnfcdr to a smaller value in the case where the intake air temperature is high than in the case where the intake air temperature is low.

The control may be executed based on the rotational speed of the crankshaft 32 during the fuel-supply cutoff period instead of the duration of the fuel-supply cutoff process.

The intervals at which the increase coefficient is updated may be modified as follows. The cylinders into which the fuel is injected in an amount increased based on the increase coefficient B which has been never been updated based on the attenuation coefficient krtnfcdr are not all the cylinders in the above-described embodiments, but may be all the cylinders.

The increase coefficient is updated at crank angle intervals of 360 degrees in the above-described embodiments. However, the intervals at which the increase coefficient is updated should not be limited to crank angle intervals of 360 degrees. For example, the increase coefficient is updated at crank angle intervals of 720 degrees. In this case, the rate of decrease in the increase ratio for the fuel injected into each cylinder is the same. However, the increase coefficient may be updated in various other methods. For example, the increase coefficient may be updated at prescribed time intervals instead of angular intervals.

The fuel injection valve should not be limited to the in-cylinder injection valve that directly injects fuel into the combustion chamber 26. For example, the fuel injection valve may be a port injection valve that injects fuel into the intake port 18.

What is claimed is:

1. A control device for an internal combustion engine, the control device comprising
an electronic control unit configured to control a fuel injection valve that injects fuel to be supplied to a combustion chamber of the internal combustion engine,
the electronic control unit being configured to calculate a base injection amount based on an amount of air taken into the internal combustion engine, the base injection amount being a base value of a fuel injection amount,
the electronic control unit being configured to execute a fuel-supply cutoff process, the fuel-supply cutoff process being a process of stopping fuel injection from the fuel injection valve,
the electronic control unit being configured to correct the base injection amount such that the base injection amount is increased, when ending the fuel-supply cutoff process and restarting fuel injection,
the electronic control unit being configured to control the fuel injection valve based on the base injection amount corrected to be increased, when the fuel-supply cutoff process ends,
the electronic control unit being configured to set an increase ratio based on which the base injection amount is increased, such that the increase ratio when a duration of the fuel-supply cutoff process is long is higher than the increase ratio when a duration of the fuel-supply cutoff process is short,
the electronic control unit being configured to decrease the increase ratio with a lapse of time after fuel injection restarts, and
the electronic control unit being configured to set a decrease rate that is an amount by which the increase ratio is decreased within a prescribed period of time, such that the decrease rate when the duration of the fuel-supply cutoff process is long is higher than the decrease rate when he duration of the fuel-supply cutoff process is short.

2. The control device according to claim 1, wherein:
the electronic control unit is configured to calculate an increase coefficient based on the duration of the fuel-supply cutoff process, and the electronic control unit is configured to multiply the base injection amount by the calculated increase coefficient to correct the base injection amount such that the base injection amount is increased;
the electronic control unit is configured to calculate a correction parameter based on the duration of the fuel-supply cutoff process; and
the electronic control unit is configured to periodically correct the increase coefficient based on the calculated correction parameter.

3. The control device according to claim 2, wherein the electronic control unit is configured to increase the decrease rate by correcting the correction parameter based on a length of time that has elapsed after the fuel-supply cutoff process ends and fuel injection restarts.

4. The control device according to claim 2, wherein the correction parameter is an attenuation coefficient by which the increase coefficient is periodically multiplied.

5. The control device according to claim 1, wherein the fuel injection valve supplies fuel to the combustion chamber by directly injecting the fuel into the combustion chamber.

6. A control method for an internal combustion engine, the control method comprising:
- controlling a fuel injection valve that injects fuel to be supplied to a combustion chamber of the internal combustion engine;
- calculating a base injection amount based on an amount of air taken into the internal combustion engine, the base injection amount is a base value of a fuel injection amount;
- executing a fuel-supply cutoff process, the fuel-supply cutoff process being a process of stopping fuel injection from the fuel injection valve;
- correcting the base injection amount such that the base injection amount is increased, when the fuel-supply cutoff process ends and fuel injection restarts;
- controlling the fuel injection valve based on the base injection amount corrected to be increased, when the fuel-supply cutoff process ends;
- setting an increase ratio based on which the base injection amount is increased, such that the increase ratio when a duration of the fuel-supply cutoff process is long is higher than the increase ratio when a duration of the fuel-supply cutoff process is short;
- decreasing the increase ratio with a lapse of time after fuel injection restarts; and
- setting a decrease rate that is an amount by which the increase ratio is decreased within a prescribed period of time, such that the decrease rate when the duration of the fuel-supply cutoff process is long is higher than the decrease rate when the duration of the fuel-supply cutoff process is short.

* * * * *